United States Patent
Grosse (10) Patent No.: US 11,250,198 B2
(45) Date of Patent: Feb. 15, 2022

(54) METHOD TO PERFORM HARDWARE SAFETY ANALYSIS WITHOUT FAULT SIMULATION

(71) Applicant: OneSpin Solutions GmbH, Munich (DE)

(72) Inventor: Jörg Grosse, Munich (DE)

(73) Assignee: ONESPIN SOLUTIONS GMBH, Munich (DE)

( * ) Notice: Subject to any disclaimer, the term of this patent is extended or adjusted under 35 U.S.C. 154(b) by 0 days.

(21) Appl. No.: 17/011,204

(22) Filed: Sep. 3, 2020

(65) Prior Publication Data

US 2021/0064810 A1 Mar. 4, 2021

Related U.S. Application Data

(60) Provisional application No. 62/895,178, filed on Sep. 3, 2019.

(51) Int. Cl.
*G06F 30/398* (2020.01)
*G06F 119/02* (2020.01)

(52) U.S. Cl.
CPC ........ *G06F 30/398* (2020.01); *G06F 2119/02* (2020.01)

(58) Field of Classification Search
CPC .................................................... G06F 30/398
USPC ........................................................ 716/106
See application file for complete search history.

(56) References Cited

U.S. PATENT DOCUMENTS

| 6,526,546 | B1 | 2/2003 | Rolland et al. |
| 2007/0011527 | A1* | 1/2007 | Goswami ....... G01R 31/318583 714/726 |
| 2014/0164859 | A1* | 6/2014 | Huang ........... G01R 31/318541 714/727 |

FOREIGN PATENT DOCUMENTS

| WO | 2004/113942 A1 | 12/2004 |
| WO | 2014/048338 A1 | 4/2014 |

OTHER PUBLICATIONS

D. Smith, "Win on the Fault Campaign Trail with Formal,", Dec. 11, 2018.
J. Wiltgen, "Reducing Your Fault Campaign Workload Through Effective Safety Analysis," Aug. 1, 2019.

* cited by examiner

*Primary Examiner* — Eric D Lee
(74) *Attorney, Agent, or Firm* — Lempia Summerfield Katz LLC (57) ABSTRACT

A safety analysis method is based on a safety-specific design structural analysis and cone of influence (COI) that does not require fault simulation. The method for performing a safety analysis of an integrated circuit based on a safety-specific design structural analysis and cone of influence comprises generating with a processor a computed set of basic design elements by intersecting two transitive cones of influence, wherein a first cone of influence is a transitive fanin cone of influence starting from a TO element and a second cone of influence is a transitive fanout cone of influence starting from a FROM element.

18 Claims, 13 Drawing Sheets

METHOD TO PERFORM HARDWARE SAFETY ANALYSIS WITHOUT FAULT SIMULATION

CROSS-REFERENCE TO RELATED APPLICATIONS

The present application claims the benefit of the filing date of U.S. Provisional Patent Application Ser. No. 62/895,178 filed by the present inventors on Sep. 3, 2019.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

Field of the Invention

The present invention relates to systems and methods for performing hardware safety analysis on integrated circuits, and more particularly, to a system and method for performing hardware safety analysis on integrated circuits without fault simulation.

Brief Description of the Related Art

A fault is an incorrect logical value that appears on some logical element in an electronic design ("design under test" or "DUT") either momentarily (due to, e.g., being hit by a high-energetic particle) or permanently (due to, e.g., material decay or permanent damage to the circuitry). Such faults can potentially alter the behavior of the electronic system. These faults can in safety critical systems lead to death, injury, or high economical losses.

The injection and simulation of the effects of faults in integrated circuits (ICs) has been a topic of interest to the semiconductor industry for nearly three decades. Originating from the need to measure fault coverage of tests aimed at identifying manufacturing defects, parallel fault simulation is an established, mature technology. Commercial tools are available from a number of electronic design automation (EDA) companies. However, due to the development and widespread adoption of alternative, more efficient technologies, in particular automatic test pattern generation (ATPG), scan chains, and logic built-in self-test (BIST), parallel fault simulators have largely fallen out of use.

In recent years, the use of complex ICs to implement intelligent, safety-critical systems has risen significantly. Advanced driver assistance systems (ADAS), for example, are included in mass-produced automobiles. To estimate and reduce the risk of electrical and electronic (E/E) system failures during operation, functional safety standards, including ISO 26262 for road vehicles, require the calculation of safety metrics related to random hardware failures (ISO 26262:5).

To measure how good a test would be in identifying parts with defects prior to shipping, fault simulators apply cycle-based input stimuli to the gate level model of the IC while injecting hypothetical faults. If a fault causes a difference in the outputs of the IC, as observed by the fault simulator, that fault is marked as covered by the input stimuli or test. Fault simulation for functional safety purposes requires a more accurate investigation of the effects of faults, and within a wider context.

Similar to manufacturing testing, using fault simulation to determine hardware safety metrics has three critical shortcomings: (1) it can only provide stimulus-dependent metrics, thus affecting confidence in the validity of results; (2) it requires large computational resources; and (3) it requires high engineering effort to setup, analyze results, and improve the quality of the stimulus.

Figure 1:
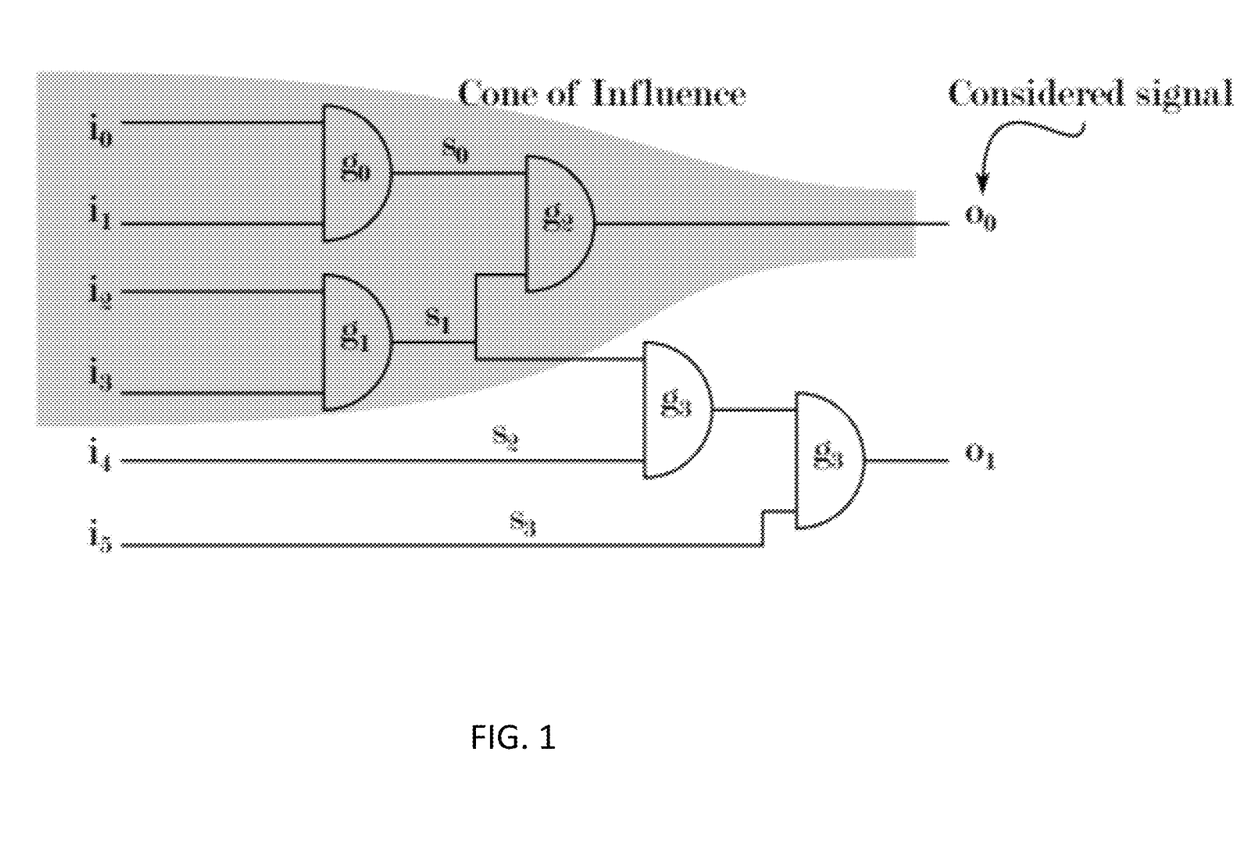
FIG. 1 is a diagram of cone of influence ("COI").

Cone of influence analysis is an established methodology in the design of digital electronic circuits. The general idea is to take only those parts of the circuit into consideration that are relevant to a specific task. When considering a design at the register-transfer or gate level (netlist), and a signal s in the design, the cone of influence of a signal s is the set of all signals as well as modules and gates the considered signal s depends on. These components can be obtained by a backward traversal starting from signal s. This process is also referred to as transitive fan-in analysis. As an example, consider the gate-level circuit shown in FIG. 1 and assume the cone of influence for the output signal o0 shall be determined. Since o0 depends on gate g2 and its two inputs s0 and s1, these elements are added in the cone of influence. Since, in turn, s0 and s1 depend on gates g0 and g1 with their inputs i0, i1, i2, and i3, also these components are added. In contrast, o0 does neither depend on the gates g3 and g4 nor on their input signals. Hence, while the overall circuit is composed of five gates in total, only three of them need to be considered in order to observe o0.

Generic structural analysis methods, such as cone-of-influence (COI) analysis and extraction, can be applied to reduce fault-lists and therefore mitigate shortcomings. These techniques have been presented in several industry papers. See, for example, D. Smith, "Win on the Fault Campaign Trail with Formal,", Dec. 11, 2018 and J. Wiltgen, "Reducing Your Fault Campaign Workload Through Effective Safety Analysis," Aug. 1, 2019.

SUMMARY OF THE INVENTION

The present invention introduces an innovative, efficient safety analysis method named SAHP (Safety-Aware Hardware Partitioning). SAHP is based on a safety-specific design structural analysis and cone of influence (COI), and does not require or limit fault simulation.

In a preferred embodiment, the present invention is a method for performing a safety analysis of an integrated circuit based on a safety-specific design structural analysis and cones of influence. The method comprises generating with a processor a computed first set of basic design elements by intersecting two transitive cones of influence. The first cone of influence is a transitive fanin cone of influence starting from at least one TO elements. The second cone of influence is a transitive fanout cone of influence starting from at least one FROM elements. The method may further comprise extracting, with the processor, from the computed first set of basic design elements a second set of basic design elements, referred to as "write bits," that are in a direct fanin of the computed set of basic design elements. The second set of basic design elements are not FROM elements of the first cone of influence, i.e., from points that are not write bits. Still further, the method may comprise extracting, with the processor, from the computed first set of basic design elements a third set of basic design elements, referred to as "read bits," that are in a direct fanout of the computed first set of basic design elements. The third set of basic design elements are not TO elements of the first cone of influence or elements in the direct fanout of the TO elements of the first cone of influence, i.e., from points that are not write bits. Further, the method may comprise generating with the processor a computed fourth set of basic design elements, wherein the fourth computed set of basic design elements, i.e., the read subpart, comprises elements from the first computed set of basic design elements that are inside a transitive fanin cone of the third set of basic design elements. Further yet, the method may comprise generating with the processor a computed a sixth set of basic design elements, wherein the sixth computed set of basic design elements, i.e., the write subpart, comprises elements that are inside a transitive fanin cone of the second set of basic design elements. The method also may comprise subtracting with the processor the fourth set of basic design elements from the computed first set of basic design elements to generate a fifth computed set of basic design elements, i.e., elements in the primary cone of influence minus the read subpart. The method may include calculating a size of logic represented by any of the computed sets of basic design elements and/or generating a fault list for the computed first fourth, fifth or sixth sets of basic design elements.

In another embodiment, the present invention is a method for performing a safety analysis of an integrated circuit component having a plurality of parts. The method comprises deriving with a processor a subpart of one of the parts of the component from a transitive fanin logic cone associated with a first point and a transitive fanout logic cone associated with a second point. The subpart comprises elements within both the transitive fanin logic cone of the TO elements and the transitive fanout logic cone of the FROM elements.

The present invention provides significant improvements over the results produced by state-of-the-art COI extraction. The SAHP method is presented using a FIFO design with error-correcting code (ECC) protection. However, the same approach can be applied to many hardware designs in the functional safety domain.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

An integrated circuit design can be considered as a hardware component, having a plurality of parts and a plurality of subparts. Subparts maybe grouped into safety mechanism and intended functionality where two such groups may form a safety feature.

Figure 2A:
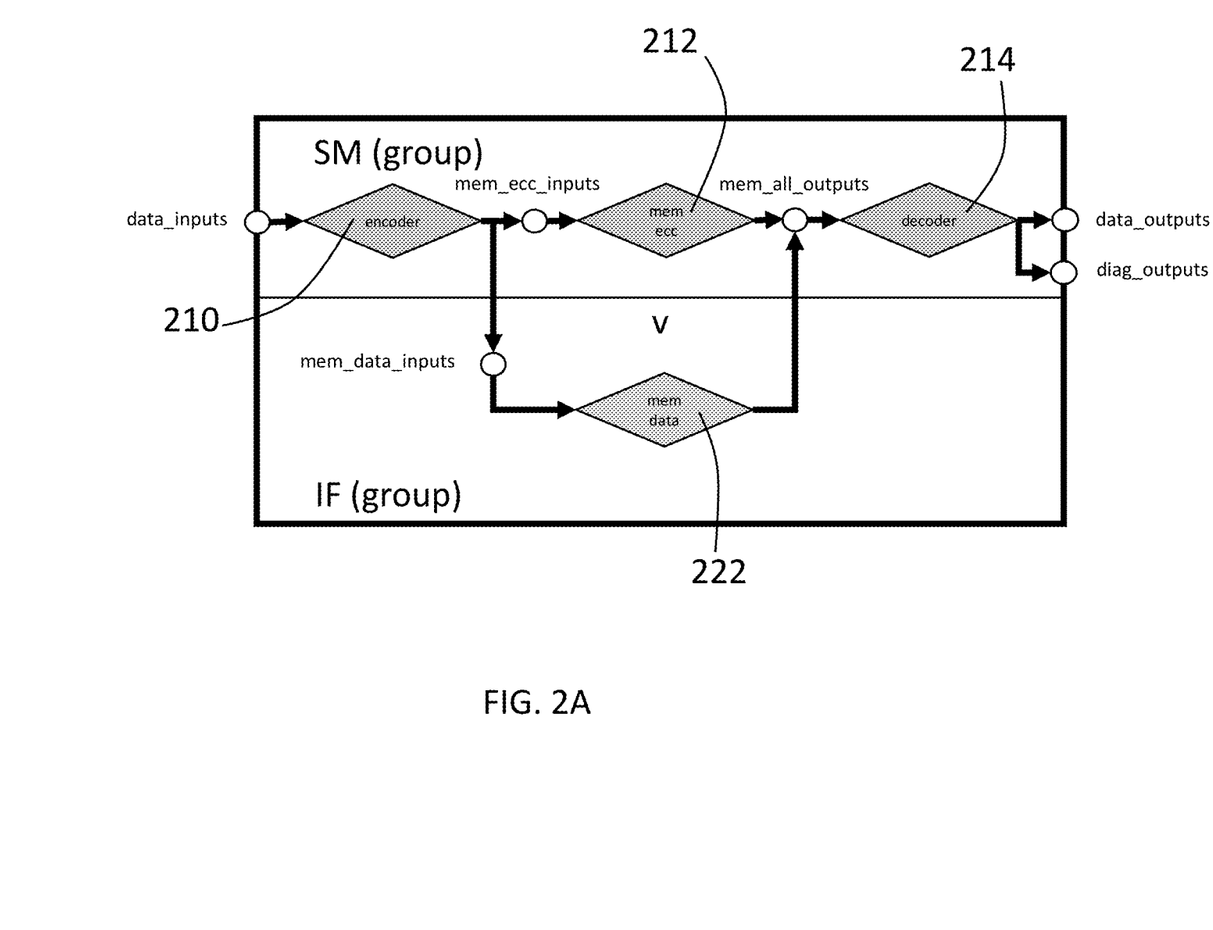
FIG. 2A illustrates an ECC protected FIFO safety feature of an integrated circuit design.

An example of a safety feature is error correction code ("ECC") protected first-in-first-out ("FIFO"), which is illustrated in FIG. 2A. In the safety mechanism group, data inputs are encoded by encoder 210. The encoded data inputs are supplied to ECC memory 212 in the safety mechanism group and to data memory 222 in the intended function group. The outputs of the ECC memory 212 and the data memory 222 are combined and decoded with decoder 214 in the safety mechanism group to produce data outputs and diagnostic outputs.

Figure 2B:
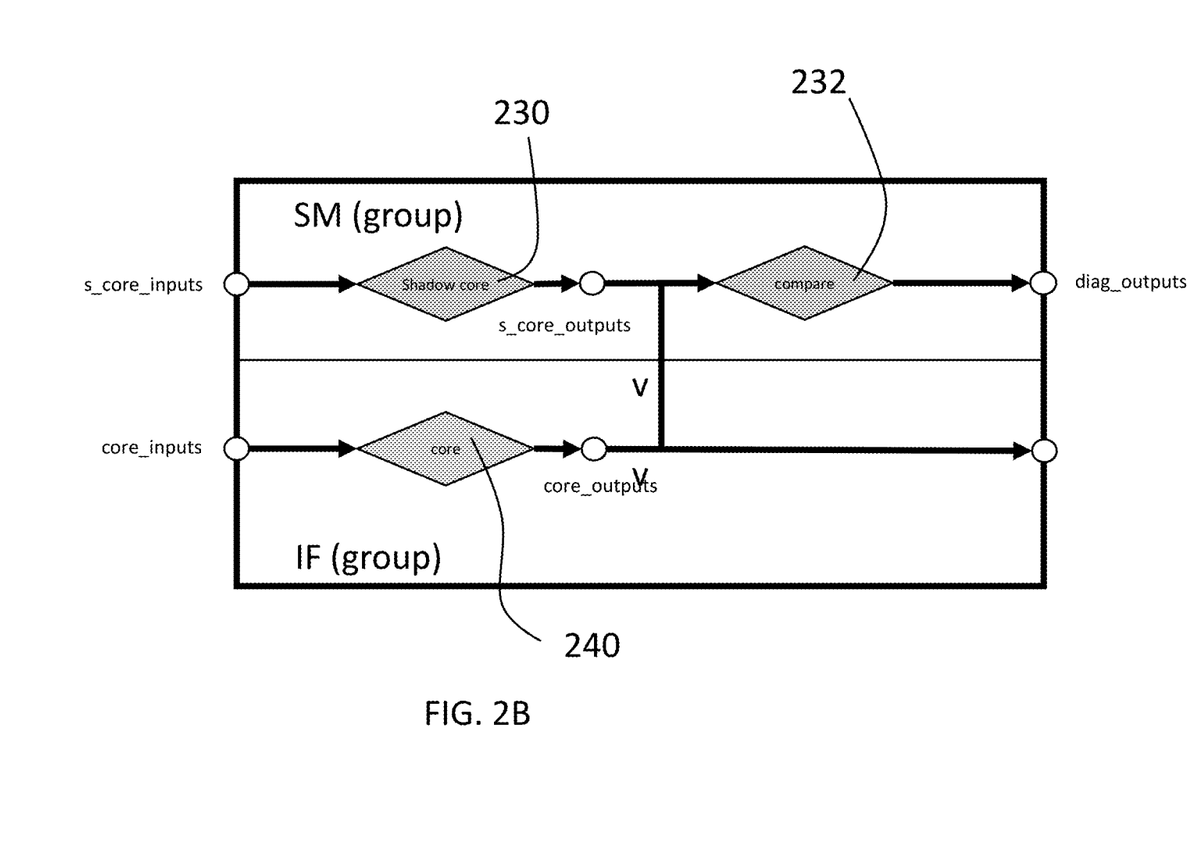
FIG. 2B illustrates a fault detection analysis lock-step core safety feature of an integrated circuit design.
Figure 2C:
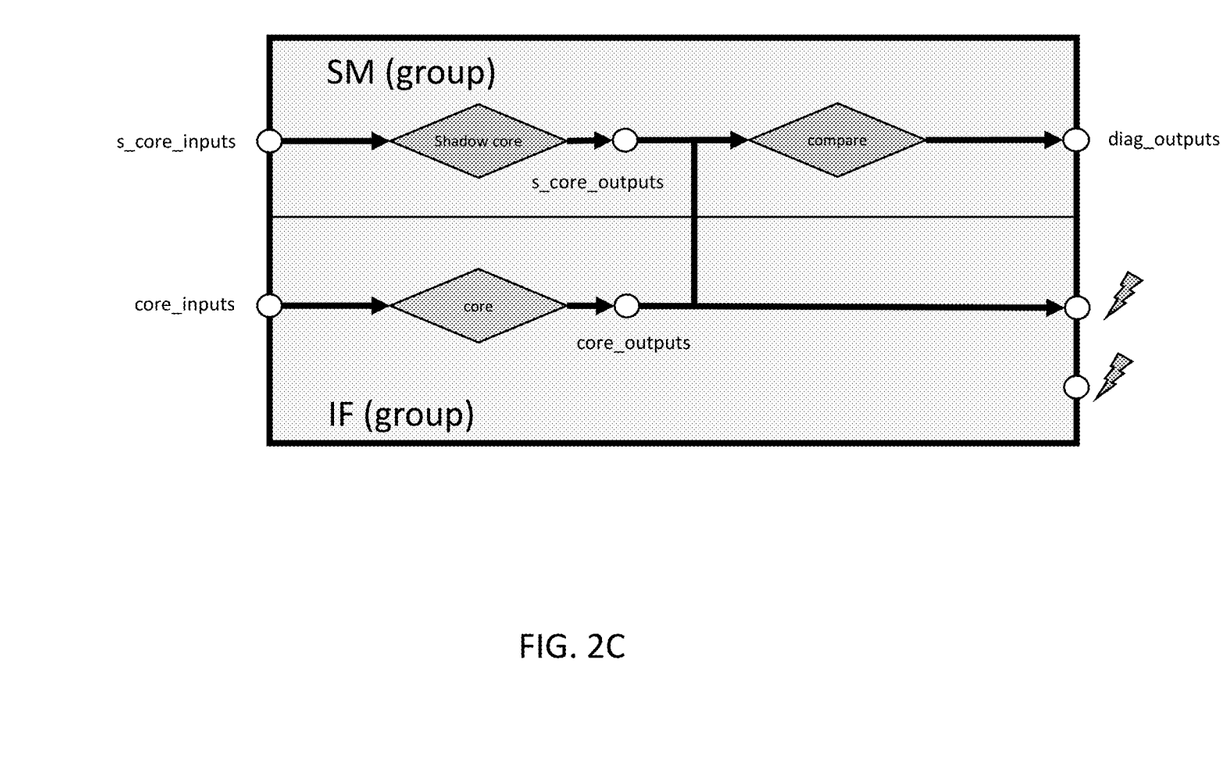
FIG. 2C illustrates extraction of unprotected logic for a lock-step core safety feature of an integrated circuit design.

A lockstep core safety mechanism is illustrated in FIG. 2B. Core inputs are provided to the core 240 in the intended function group. Shadow core inputs are provided to the shadow core 230 in the safety mechanism. The shadow core outputs and the core outputs are compared in the comparator 232 in the safety mechanism to produce diagnostic outputs. As shown in FIG. 2C, however, some logic may remain unprotected by such a safety mechanism.

Figure 3A:
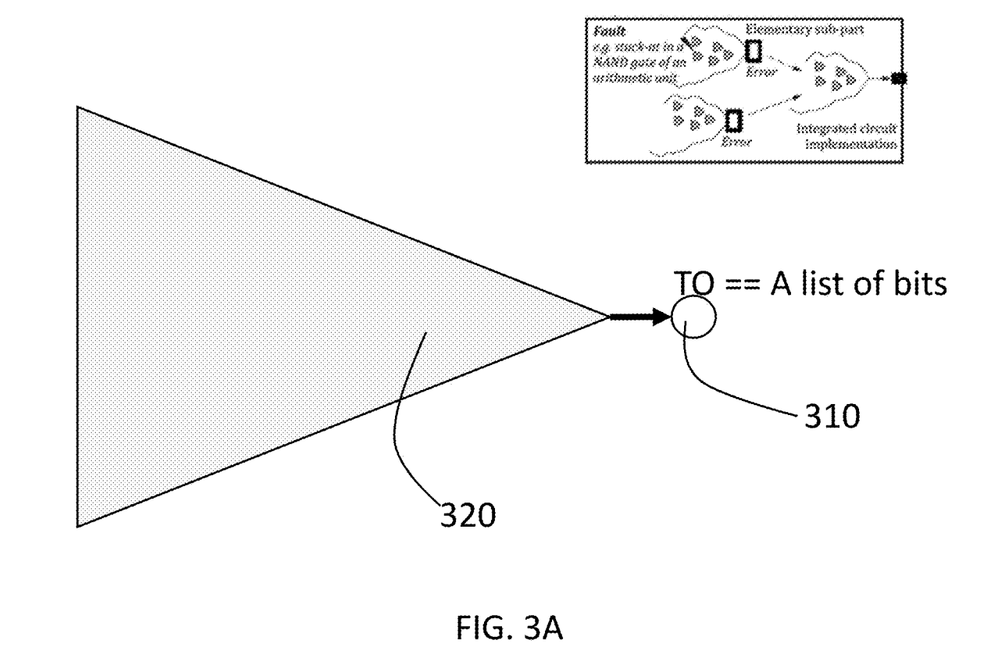
FIGS. 3A-3G illustrate a method for extraction of a subpart of an integrated circuit design in accordance with a preferred embodiment of the present invention.
Figure 3B:
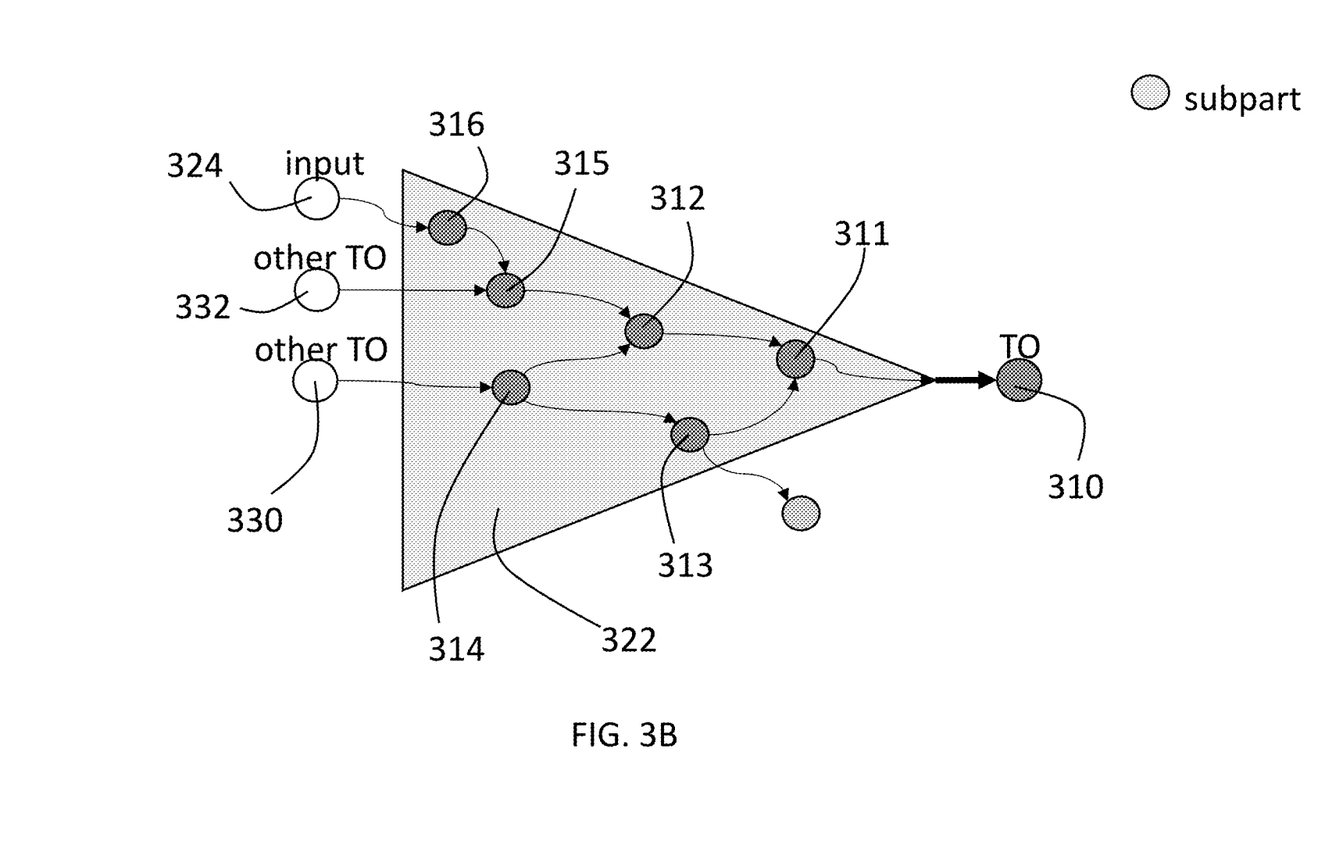

Accurate extraction of a subpart, or set of basic design elements, is non-trivial. Basic design elements may include, for example, bits, states, ports, signals, wires, gates or cells. Extraction of a subpart and determination of where the safety mechanism or protected logic begins and/or ends in accordance with a preferred embodiment of the present invention is described with reference to FIGS. 3A-3G. Generally, in the method of the present invention a processor automatically generates a computed first set of basic design elements by intersecting two transitive cones of influence, wherein a first cone of influence is a transitive fanin cone of influence starting from a first point ("TO elements") and a second cone of influence is a transitive fanout cone of influence starting from an second point ("FROM elements"). While the example shown in FIGS. 3A-3G have only a single TO element 310, more than one TO element 310 may be included. As shown in FIG. 3A, there is a first point or "TO" element 310 from which a transitive fanin cone of influence 320 is extracted. As shown in FIG. 3B, the subpart 322 initially is identified as design elements 311, 312, 313, 314, 315, 316 within the transitive fanin cone of influence 320. The cone of influence 320 stops at TO elements 330, 332 of other subparts and other primary design input(s) 334.

Figure 3C:
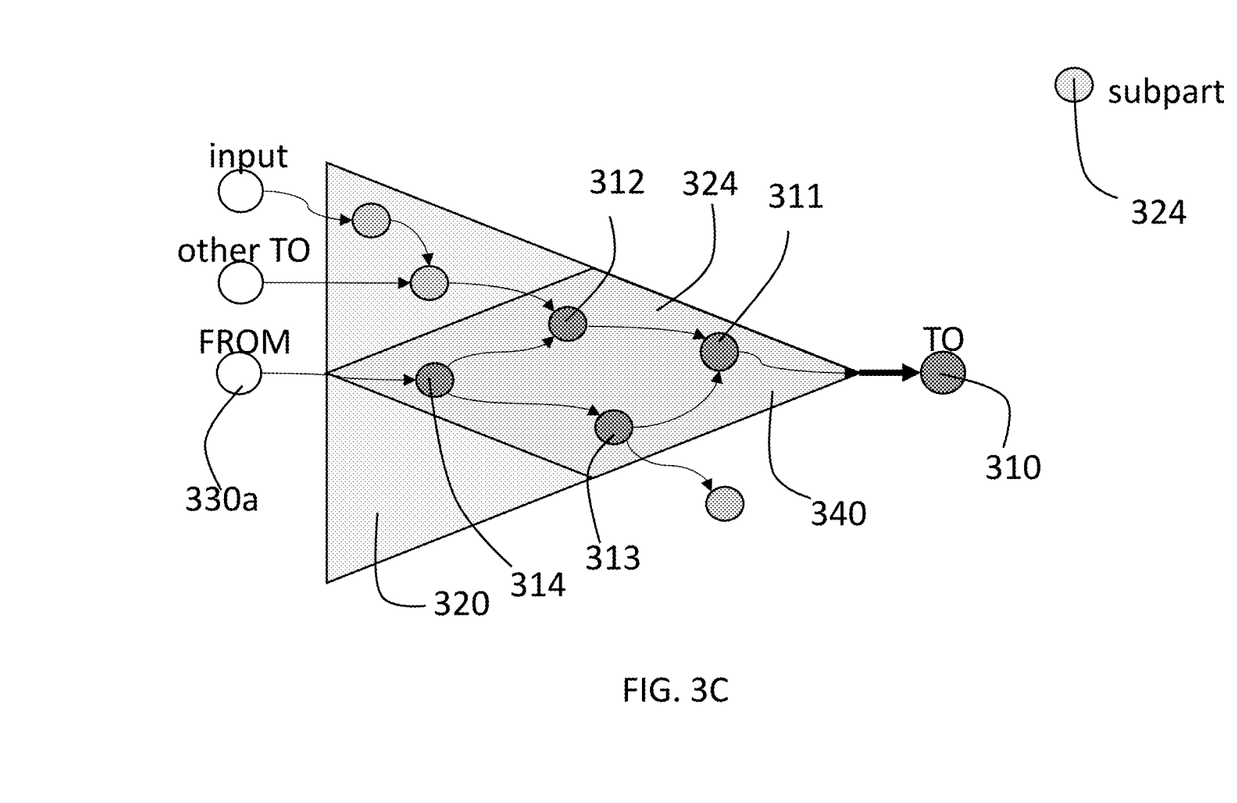

In the next step shown in FIG. 3C, the TO element 330 from a different subpart becomes a FROM element 330a for this subpart, and a second cone of influence 340 is a transitive fanout cone of influence of FROM element 330a. This second cone of influence 340, i.e., the transitive fanout, overlays the first cone of influence 320. The intersection of these two cones of influence provides a more precisely defined computed subpart or set 324 of basic design elements 311, 312, 313, 314 that includes, for example, a data path only. The processor may calculate a size of logic represented by the subpart 324 and may generate a fault list for the basic design elements in subpart 324.

Figure 3D:
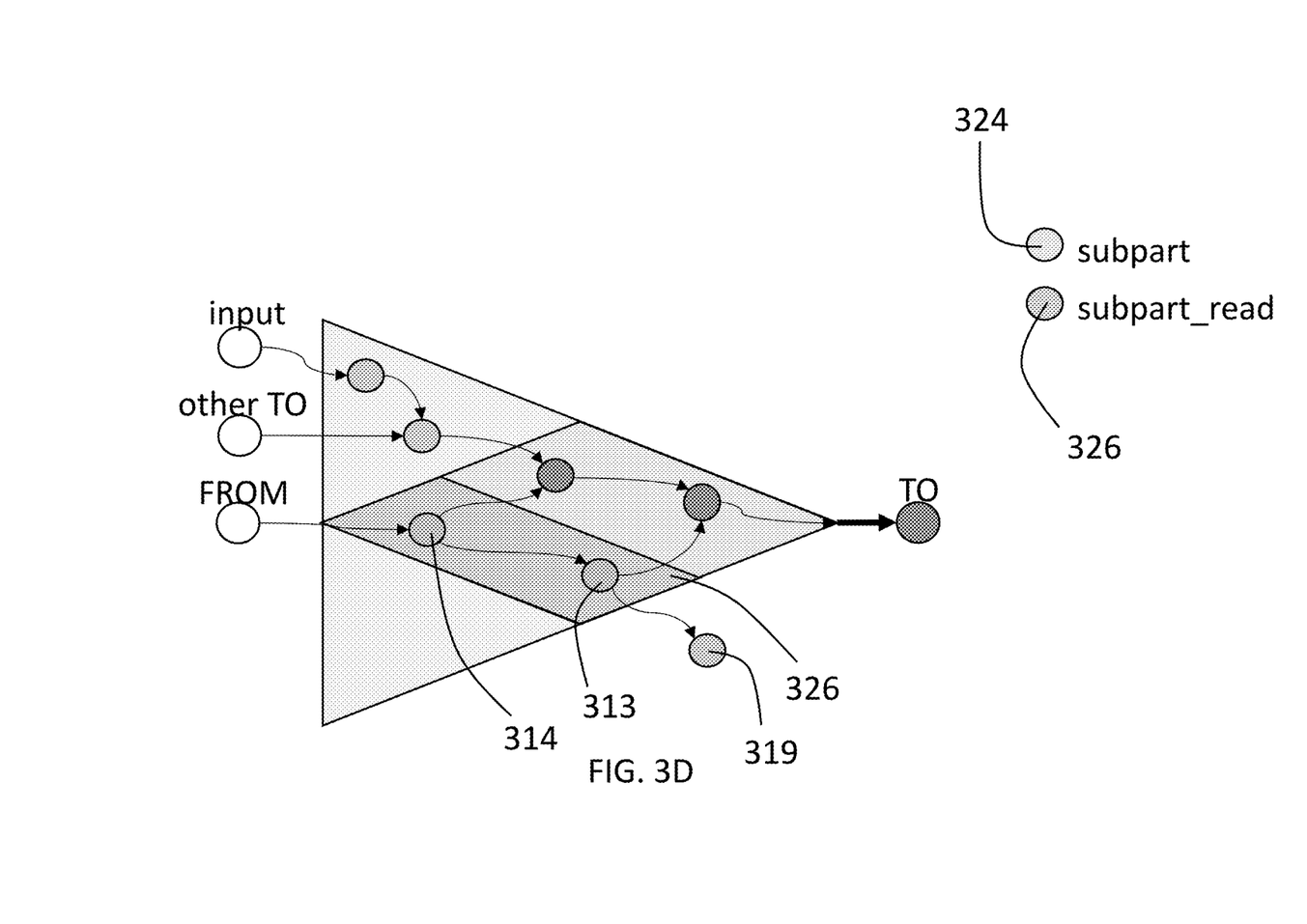

The processor identifies or extracts elements (logic) in the computed subpart or set 324 (FIG. 3C) of basic design elements 313, 314 that are read by other subparts by extracting a transitive fanin-cone starting from the read element 319 (FIG. 3D) and intersecting it with the subpart 324 (FIG. 3C). These elements 313, 314 can be referred to collectively as subpart_read 326 (FIG. 3D). The TO element(s) of the first cone of influence and FROM element(s) of the second cone of influence may be included in the computed subpart 324. In one preferred embodiment, the TO element(s) are included in subpart 324 while the FROM elements are not include in subpart 324.

As shown in FIG. 3D, the processor also identifies all basic design elements 319, called "read bits," which are in the direct fanout of subpart 324 (FIG. 3C) and are not TO element 310 or direct fanout of TO element 310. In other words, these read elements are elements that are not in the sub-part but read other elements in the sub-part. These read elements are for example not protected by a safety mechanism.

Figure 3E:
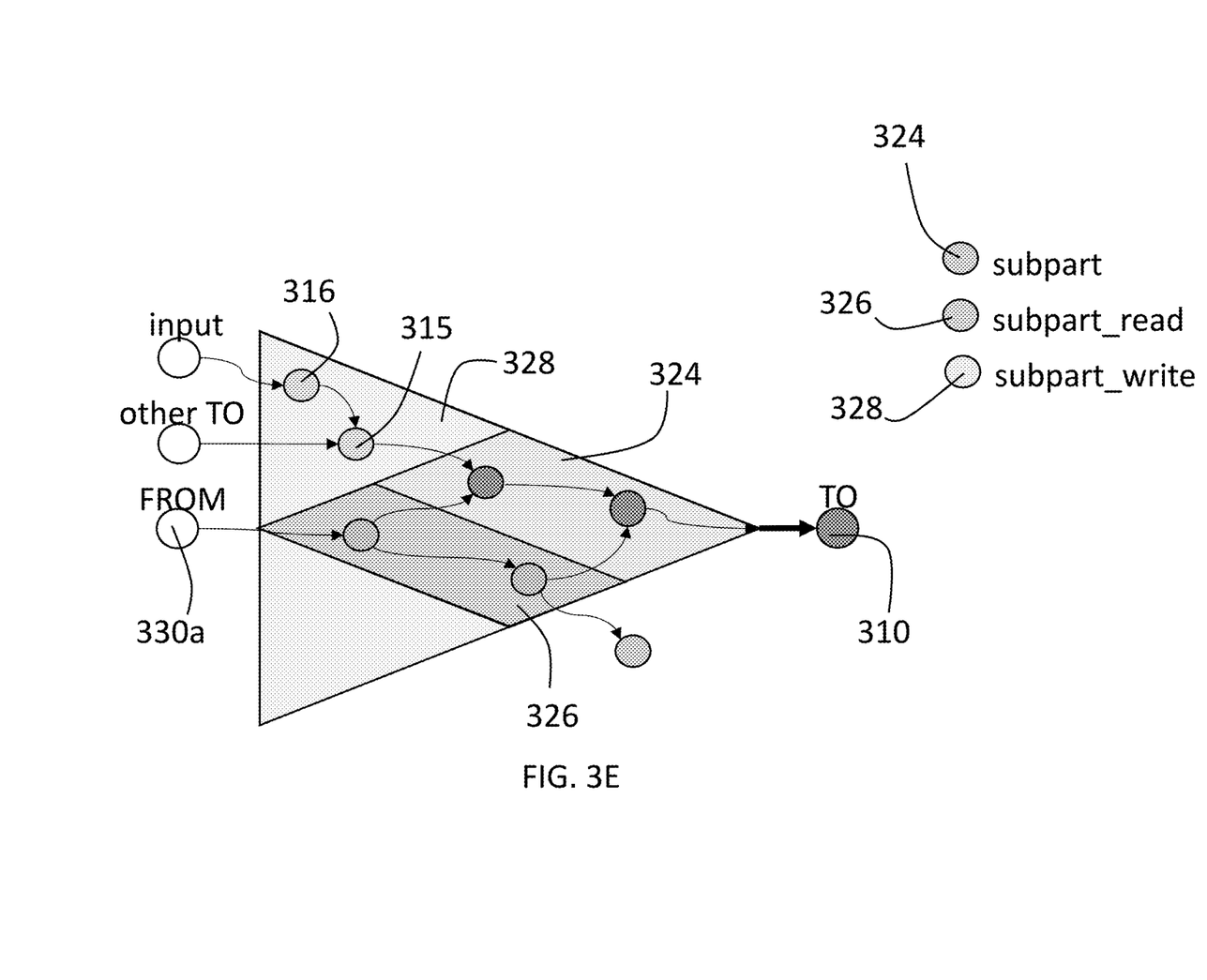
Figure 3F:
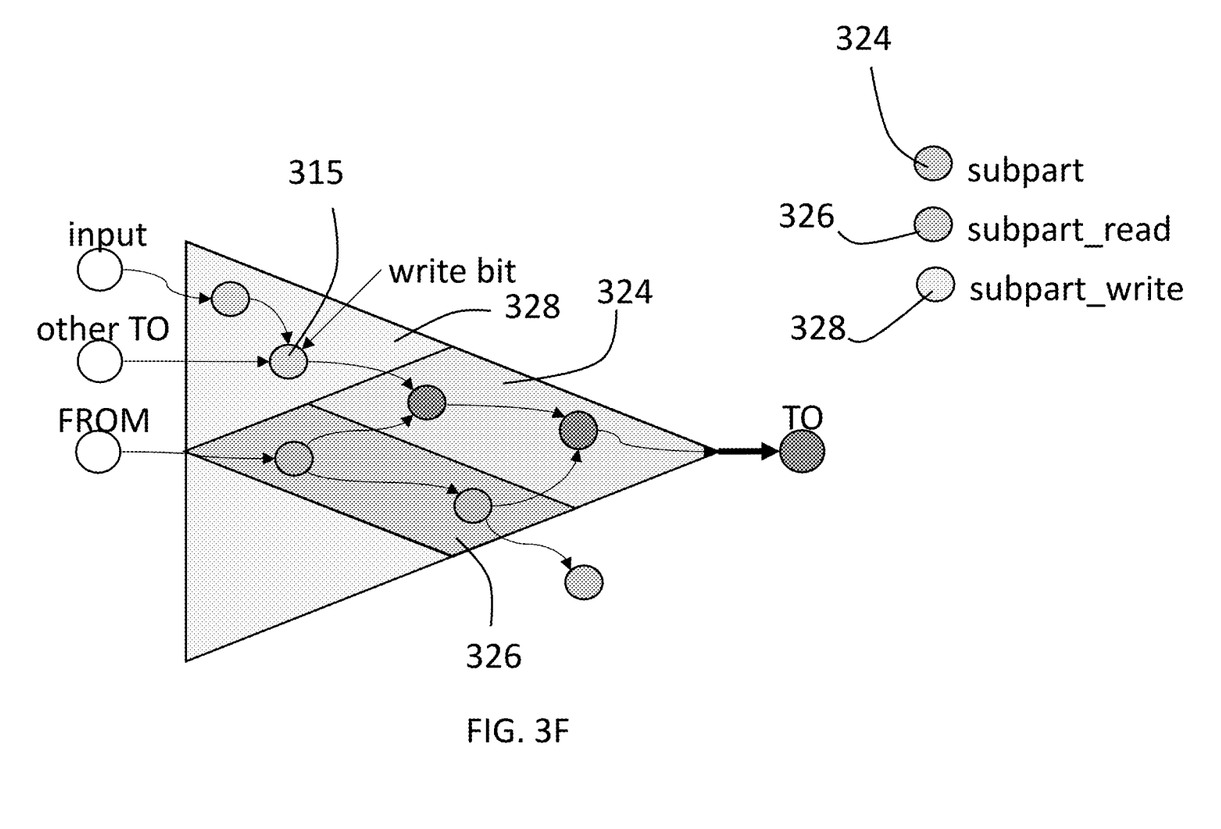
Figure 3G:
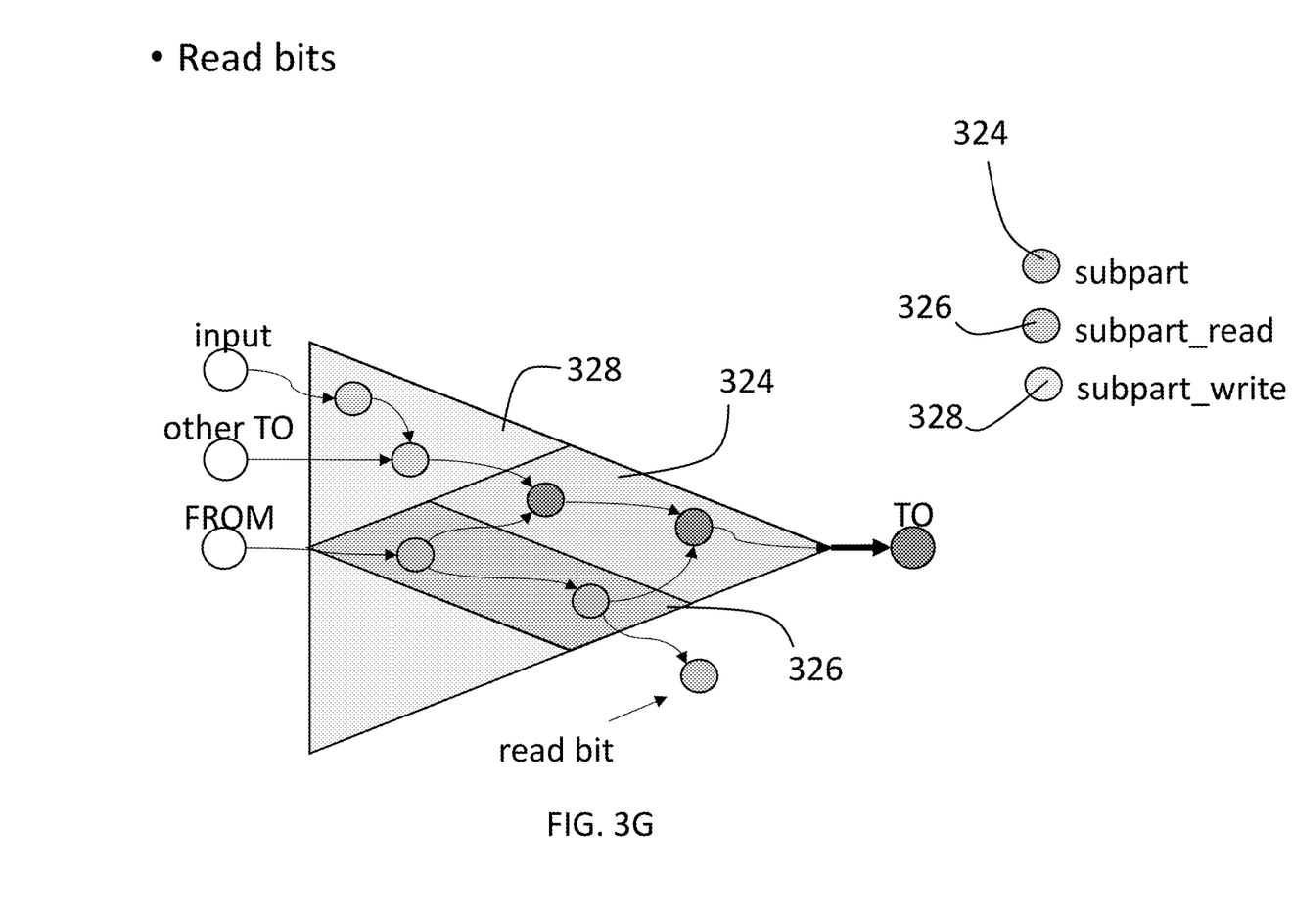

As shown in FIG. 3E, the subpart 322 (FIG. 3B) also contains potential residual logic, referred to collectively as subpart_write 328, that controls the subpart 324. The element 315 that writes to elements in the subpart 324 can be referred to as a "write bit" 315 (FIG. 3F). These write bits are in the direct fanin of any elements composing subpart 324 (FIG. 3C) and are extracted as such.

The subpart_write 328 (FIG. 3E) may be considered as the transitive fanin cone of write bit 315 that does not include TO or cone elements of other subparts. The processor identifies or extracts the subpart_write 328 for example as potential residual logic or elements.

The processor may subtract the subpart_read 326 from the subpart 324, i.e., the computed first set of basic design elements, to generate another subpart of set of basic design elements, so that, for example subpart_read is considered to contain potentially protected elements whereas this new subpart contains protected logic or elements.

Figure 4:
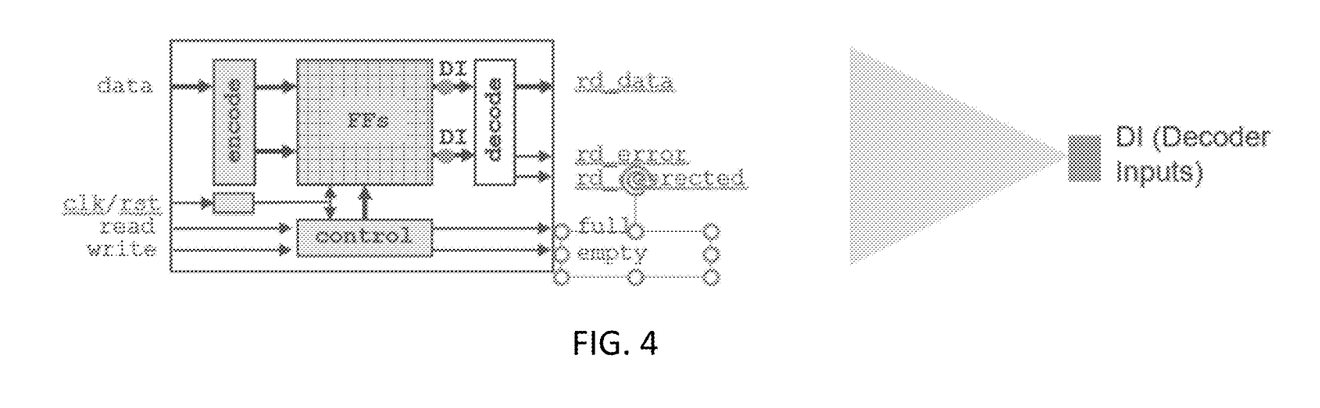
FIG. 4 illustrates a COI analysis starting from decoder inputs in accordance with a preferred embodiment of the present invention.

Looking now at the invention in the context of a memory, an error code correction ("ECC") protected first-in first-out ("FIFO") design in accordance with the present invention is illustrated in FIG. 4. The design can be considered as a hardware part consisting of a number of subparts, including the hamming encoder and decoder, which enable double-bit memory error detection, and single-bit memory error correction, and the flip-flops (FFs) or memory, which store the encoded FIFO entries, including the ECC bits. The encoder and decoder subparts implement the safety mechanism (SM) protecting the memory. The control logic, which manages the FIFO read and write pointers, and the full and empty flags, is another subpart. This subpart is not protected by any SM.

To apply COI analysis and extraction on the ECC FIFO design, a set of first points ("TO elements") must be defined for each subpart. The population of faults that are protected by the ECC SM can be extracted using the inputs of the decoder, marked as "DI" in FIG. 4, as TO elements. The transitive fan-in cone is extracted, and a fault list is generated. This step ensures that only faults that structurally propagate to at least one TO element are included in the faults list.

As shown in FIG. 4, the resulting list will include all faults in logic outside the decoder. This is an over approximation as, for example, faults in the control logic are not protected by the SM. Using this list, time and resources will be wasted simulating and debugging control logic faults that will always escape detection from the SM, regardless of the stimulus applied.

Figure 5:
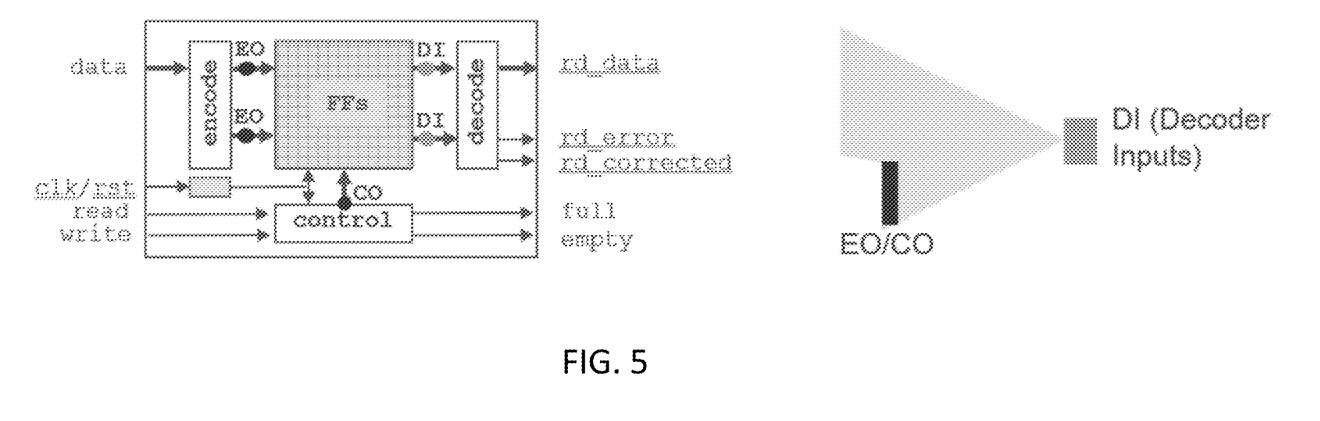
FIG. 5 illustrates COI analysis starting from decoder inputs and stopping at encoder and control logic outputs in accordance with a preferred embodiment of the present invention.

The basic COI analysis method can be significantly improved by introducing stop points, illustrated in FIG. 5 as "EO" (encoder outputs) and "CO" (control logic outputs). EO and CO are used as stop points during the COI analysis starting from the decoder inputs DI. This leads to a more precise list, which does not include faults in the control logic. It is worth noting that stop points can also be used as TO elements for the COI analysis and extraction of the fault lists for the encoder and control logic subparts. Using this observation, the need for specifying stop points can be eliminated. When doing COI analysis for a certain subpart, all TO elements of the other subparts can be used as stop points during the current analysis. This idea enhances basic COI analysis, enabling the extraction of more precise fault lists for each subpart. Assuming correct specification of the TO elements for all subparts, we can immediately deduce, without running any fault simulation, that all faults in the FFs subpart are detected, while all faults in the control logic subpart are undetected.

SAHP produces more precise results compared to basic COI analysis and extraction. However, it does rely on correct identification of TO elements for each subpart, which might be difficult in some cases. Identifying the TO elements of the control logic subpart (CO in FIG. 5), for example, is not trivial as this logic is not isolated in a separate module.

This challenge can be addressed by introducing the new concept of FROM elements. In addition to extracting the transitive fan-in cone from the TO elements, DI in the ECC FIFO example, we also consider the points where the protection by the SM starts, EO in the ECC FIFO example.

Figure 6:
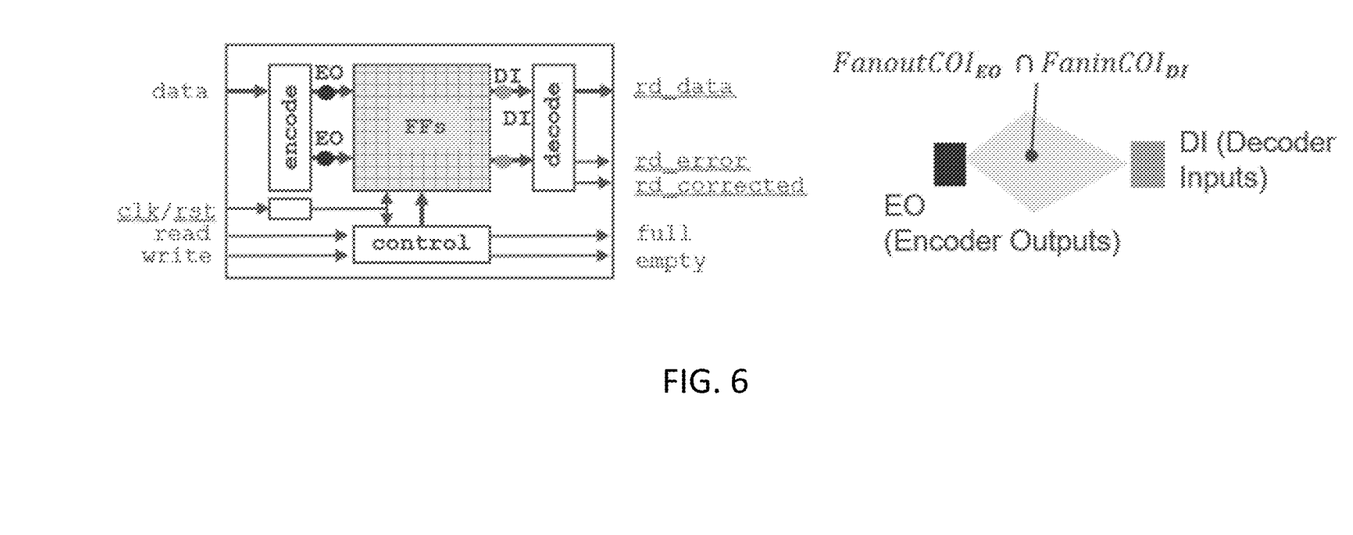
FIG. 6 illustrates that the intersection of FanoutCOI and FaninCOI in the present invention identifies the protected control logic without the need of defining stop points for the control logic.

Unlike previously introduced stop points, FROM elements do not only act as stop points but are also used as TO elements for a transitive fan-out COI analysis and extraction. Intersecting the transitive fan-out of EO (FanoutCOI in FIG. 6) with the transitive fan-in of DI (FaninCOI in FIG. 4) provides the exact list of faults that are protected by the SM. Crucially, this result is achieved without the need for defining CO as stop points or relying or any hierarchical IC design information during the COI analysis of the FFs subpart. It is worth noting that the CO points in FIG. 5 are the write bits of the FFs subpart and sub sequentially the write subpart of the FF subpart contains the control logic. Read bits and read subparts would work in a similar way but are not demonstrated within this example.

Similar to the TO elements, FROM elements must be associated with the subpart under analysis. It is preferable to define FROM elements that are also TO elements for one or more other subparts. This reduces the total number of points that need to be defined and ensures that the analysis of all subparts covers the entire circuit. Moreover, TO elements can be used as stop points during the transitive fan-out cone extraction, although this is not required. During the analysis of a subpart, TO and FROM elements of all other subparts can be used to speed-up the extraction of the fault list.

The SAHP method provides more accurate fault lists compared to basic COI analysis and extraction. This eliminates the need to simulate numerous faults, resulting in significant effort and computational savings. SAHP can be applied using FROM elements or stop points. The two approaches can also be combined. Using FROM elements is preferred as results are more accurate, particularly in designs with complex control logic where only the data path logic is protected by a SM.

Any of the generated or extracted sets of basic design elements, calculations and lists may be stored in memory or other storage and may be displayed, for example, on a display.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for performing a safety analysis of an integrated circuit based on a safety-specific design structural analysis and cone of influence, the method comprising:
   providing an integrated circuit having a plurality of parts and a plurality of subparts, wherein subparts of the plurality of subparts are grouped into safety mechanism and intended functionality to provide safety features of the integrated circuit;
   generating, with a processor, a computed first set of basic design elements by intersecting two transitive cones of influence, wherein the intersection of the two transitive cones of influence provides a subpart of the plurality of subparts of the integrated circuit, wherein a first cone of influence is a transitive fanin cone of influence starting from at least one TO element, and wherein a second cone of influence is a transitive fanout cone of influence starting from at least one FROM element; and
   generating, with the processor, a fault list for the computed first set of basic design elements.

2. The method of claim 1, further comprising:
   extracting, with the processor, from the computed first set of basic design elements, a second set of basic design elements that are in a direct fanin of the computed first set of basic design elements.

3. The method of claim 2, wherein the second set of basic design elements are not FROM elements of the first cone of influence.

4. The method of claim 2, further comprising:
   generating, with the processor, a computed sixth set of basic design elements, wherein the computed sixth set of basic design elements comprises elements that are inside a transitive fanin cone of the second set of basic design elements.

5. The method of claim 1, further comprising:
   extracting, with the processor, from the computed first set of basic design elements, a third set of basic design elements that are in a direct fanout of the computed first set of basic design elements.

6. The method of claim 5, wherein the third set of basic design elements are not TO elements of the first cone of influence or elements in the direct fanout of the TO elements of the first cone of influence.

7. The method of claim 5, further comprising:
   generating, with the processor, a computed fourth set of basic design elements, wherein the computed fourth set of basic design elements comprises elements from the computed first set that are inside a transitive fanin cone of the third set of basic design elements.

8. The method of claim 1, further comprising:
   calculating, with the processor, a size of logic represented by the computed first set of basic design elements.

9. The method of claim 1, wherein at least one of the at least one TO element and the at least one FROM element is included in the computed first set of basic design elements.

10. A method for performing a safety analysis of an integrated circuit based on a safety-specific design structural analysis and cone of influence, the method comprising:
    generating, with a processor, a computed first set of basic design elements by intersecting two transitive cones of influence, wherein a first cone of influence is a transitive fanin cone of influence starting from at least one TO element, and wherein a second cone of influence is a transitive fanout cone of influence starting from at least one FROM element;
    extracting, with the processor, from the computed first set of basic design elements, a third set of basic design elements that are in a direct fanout of the computed first set of basic design elements;
    generating, with the processor, a computed fourth set of basic design elements, wherein the computed fourth set of basic design elements comprises elements from the computed first set of basic design elements that are inside a transitive fanin cone of the third set of basic design elements; and
    subtracting, with the processor, the computed fourth set of basic design elements from the computed first set of basic design elements to generate a computed fifth set of basic design elements.

11. The method of claim 10, further comprising:
    extracting, with the processor, from the computed first set of basic design elements, a second set of basic design elements that are in a direct fanin of the computed first set of basic design elements.

12. The method of claim 11, wherein the second set of basic design elements are not FROM elements of the first cone of influence.

13. The method of claim 11, further comprising:
    generating, with the processor, a computed sixth set of basic design elements, wherein the computed sixth set of basic design elements comprises elements that are inside a transitive fanin cone of the second set of basic design elements.

14. The method of claim 10, wherein the third set of basic design elements are not TO elements of the first cone of influence or elements in the direct fanout of the TO elements of the first cone of influence.

15. The method of claim 10, further comprising:
    calculating, with the processor, a size of logic represented by the computed first set of basic design elements.

16. The method of claim 10, further comprising:
    generating, with the processor, a fault list for the computed first set of basic design elements.

17. The method of claim 10, wherein at least one of the at least one TO element and the at least one FROM element is included in the computed first set of basic design elements.

18. A method for performing a safety analysis of an integrated circuit component having a plurality of parts, the method comprising:

deriving, with a processor, a first subpart of one part of the plurality of parts of the integrated circuit component from a transitive fanin logic cone associated with a first point and a transitive fanout logic cone associated with a second point, wherein the first subpart comprises elements within both the transitive fanin logic cone of a TO element and the transitive fanout logic cone of a FROM element;

extracting, with the processor, from the first subpart, a second subpart of the one part of the plurality of parts of the integrated circuit component that is in a direct fanout of the first subpart;

deriving, with the processor, a third subpart of the one part of the plurality of parts of the integrated circuit component, wherein the third subpart comprises elements from the first subpart that are inside a transitive fanin cone of the second subpart; and subtracting, with the processor, the third subpart from the first subpart to generate a fourth subpart of the one part of the plurality of parts of the integrated circuit component.

* * * * *